Patented Mar. 26, 1935

1,996,033

UNITED STATES PATENT OFFICE 1,996,033

SOUND ABSORBING COMPOSITION

George D. King, Chicago, Ill., assignor to United States Gypsum Company, Chicago, Ill., a corporation of Illinois No Drawing. Application April 15, 1929, Serial No. 355,420. Renewed September 7, 1933

18 Claims. (Cl. 106—36)

This invention relates to sound absorbing materials and has reference more particularly to a sound absorbing composition having as a base a fibrous material, such as mineral wool, together with certain articles manufactured therefrom.

In the preparation of sound absorbing compositions having a fibrous material as a base, it is desirable to impart to the composition certain qualities which make it suitable for molding into shapes such as tile, slabs, or ornamental castings of different kinds. The composition should be so prepared that the resulting shapes, when applied to the wall or ceiling, will be resistant to moisture and yet will be firm and rigid so as to be structurally strong. It is also important that the resulting acoustical shapes have a high porosity so that the sound absorbing efficiency will be high. It is contemplated that my improved composition is also suitable for use as a paint or plaster to be applied to walls or ceilings, in which uses its improved workability and plasticity play an especially important part.

The object of this invention, therefore, is to provide a sound absorbing composition, having a fibrous material as a base, which is suitable for molding into special shapes.

Another object of the invention is to provide a sound absorbing composition having a granular mineral wool base which is suitable for use as a paint or a plaster, or for molding into tile.

A further object of the invention is to provide a sound absorbing composition for applying as a paint or plaster or for molding into tile, etc., said composition having the properties of providing the paint, plaster or tile with strength and resistance to moisture.

A still further object of the invention is to provide a sound absorbing composition which has a high porosity, the pores and interstices being of such a character that a high sound absorbing efficiency is obtained; also to improve sound absorbing compositions and articles in other respects hereinafter specified and claimed.

As a fibrous base for my improved composition, I prefer mineral wool because of its non-wilting character or moisture resistance of the individual fibers, great, connected porosity, resulting in superior sound absorbing qualities, and also because of its fireproof and vermin proof nature. I have had especially good results in the use of a special form of mineral wool, known as granular mineral wool. This is mineral wool in the shape of highly porous little balls of rather irregular shape, and of the size of a pea or larger. This granular wool is made by mechanically processing regular wool and is procurable on the market, being familiarly known as "granulated mineral wool." Wool put into this form by any process that gives wool of this character is suitable for my purpose. The granular wool is pourable and free-running, somewhat like cottonseed or corn kernels, whereas the regular wool is matted or felted and is more like cotton in character. The use of granular wool in my composition makes it easier to dry mix and wet mix, and easier to mold into tile or apply as paint or plaster. It should be understood, however, that other fibrous materials, especially if formed into granules, may be substituted as a base for the composition, such as wood or other cellulose fibers or other light weight material which is suitable.

The other ingredients in my acoustical composition are:—

2. A binder. For this I prefer to use a cooked thick-boiling starch gel for plant molded products such as tile. When a dry mixture is desired, such as for plaster and paint to be mixed with water on the job, I prefer an adhesive prepared from corn or wheat flour (mechanically modified), such as is used in foundry cores,—for example the Ceres paste or K. B. paste on the market.

3. An agent to give plasticity to the composition on mixing with water. Such plasticity enables rapid and easy mechanical formation of the tile, etc., and more practical application of the paint or plaster. For this I prefer to use Karaya gum in a dry mixture. In a plant moulded product the cooked starch solution will largely serve this purpose, but I find it preferable to use some of the gum, even in such mixes, as the gum improves the plasticity and workability of the composition. Karaya gum is a material similar to tragacanth gum in that it is capable of absorbing large amounts of water (as high as 50 parts water to 1 part gum by weight) forming a syrupy but not very sticky solution.

4. An agent to give water resistance. For this I prefer to use an albuminous substance, such as blood albumin or animal glue, coupled with a salt, such as copper sulfate.

Preferable but not essential ingredients are:—

5. A mineral filler to reduce the tendency of the binder to smolder when burned, such as pyrophyllite.

6. A preservative, such as beta naphthol. The copper sulfate also acts as a preservative.

7. Coloring matter, such as raw sienna.

For some uses, such as for molding under pressure, the agent or agents used to give plasticity, that is the Karaya gum or cooked starch solution, may be omitted. But a binder must be used,—for example, the modified corn flour mentioned above.

The preferred formula for my composition is given as follows:—

| | |
|---|---|
| Globe pearl starch | 5½ lbs. |
| Karaya gum | 1¼ lbs. |
| Raw sienna | 10 ozs. |
| Pyrophyllite | 3 lbs. |
| Beta naphthol | ½ oz. |
| Copper sulfate | 8 ozs. |
| Light blood albumin | 1 lb. |
| Granulated mineral wool (4 cu. ft.) | 56 lbs. |

Water sufficient to give desired plasticity.

In making up the composition, the following preliminary solutions are made:—

(a) A cooked starch gel is made by bringing to boiling the starch in 125 lbs. cold water, preferably with some stirring.

(b) A fluid, gel-like solution, is made by adding to 45 lbs. of cold water during fast agitation, the Karaya gum, pyrophyllite, and raw sienna.

(c) A solution is made of the copper sulfate and beta naphthol in 5 lbs. warm water.

(d) The blood albumen is soaked in 8 lbs. cold water for several hours, and then stirred into solution.

In making up the composition, solutions (a) and (b) are mixed thoroughly. Then the solution (d) is added to the mixture of (a) and (b). Solution (c) is now added. The temperature of the mix should not be over 150° F. To this composite solution mineral wool is added and thoroughly mixed in. Of course other satisfactory methods of mixing may be devised by any one familiar with these ingredients.

A plastic mass results and this mass may be molded in perforated steel plate forms, burlap being used on the bottom of the forms as a backing of the mass. In place of the burlap any other open mesh fabric may be used. The composition is screeded off to the top of the form and then introduced into dryers where the temperature is maintained at 200°-250° F. until the tiles or other shapes are dry. After drying, the molded product is removed from the mold and the burlap may be stripped off from the face of the tile and used again or may be left in place. The slab or tiles are then cut into the desired finished sizes with a saw, or otherwise, and one face of the tile is buffed or ground so as to increase the sound absorption by exposing the interior of the tile. The opposite side of the tile may be buffed or ground slightly to level it up, if desired. Further truing up, beveling, etc. may be done as in the manner of working wood.

Through the use of the granulated mineral wool, the face of the resulting tile after buffing is composed of numerous soft spots consisting of the balls of the mineral wool which have not been materially penetrated by the binding agent, these balls being separated by a harder skeleton of structure containing a larger percentage of the binding material. These soft spots may be decreased in size and quantity by increasing time or thoroughness of the mixing of the wet mass, or vice versa. Also the use of granular mineral wool results in a tile which, according to the degree of wet mixing, will have more or less valleys or interstices between the granules. By proper care in obtaining the desired ratio of such valleys, soft spots and harder spots, the efficiency of absorption of waves of different frequency or pitch can be controlled to some extent.

I have found that by a slight modification in which the Karaya gum may be omitted from the formula and a modified corn flour (as named above) binder substituted for the cooked starch solution, the composition is suitable for molding under pressure. In such a case, pressure is applied to the molds by means of rolls or a ram in the usual way, the amount of pressure used determining the density of the resulting tiles or other shapes.

My improved composition, including the gum and cooked starch solution, may also be applied to walls in the form of paint or plaster, using a brush or trowel respectively. When used for these purposes, the water content of the composition may be altered considerably in the formula above given so as to give proper application properties. For such a paint or plaster it is many times desirable to use a dry mixture which may be dry mixed in the plant and then mixed on the job with water for application. In such a case I prefer a dry mixture of which the following is an illustrative formula:—

| | |
|---|---|
| Ceres or K. B. paste (modified corn flour adhesive) | 8 lbs. |
| Karaya gum | 3 lbs. |
| Raw sienna | 10 ozs. |
| Pyrophyllite | 3 lbs. |
| Beta naphthol | ½ oz. |
| Granulated mineral wool | 56 lbs. |

If desired, water resistance may be obtained by including in the combination, ½ lb. of copper sulfate and 2 lbs. of ground cold water soluble animal glue, or a casein glue may be used instead of the animal glue. The acoustical absorption of the plaster or paint may be improved by sanding off the surfaces of the dried plaster or paint.

The cooked starch and the Karaya gum used in the above formula both have the property of holding in suspension large amounts of water, and when this water dries out of the resulting composition, the resulting tile, paint or plaster have a very high porosity and therefore are very efficient as sound absorbing materials. The normal high absorbing qualities of mineral wool may, in some cases, be materially increased through the use of such gel-forming substances which produce the high porosity in the finished, molded articles. It is believed that the salt used, of which copper sulfate is highly effective, combines chemically, with the glue or albumin to form a compound which materially improves the water resisting qualities of the composition. Some other salts may be substituted for the copper sulfate, such as lead acetate or mercury salts, such salts being much superior to formaldehyde or potassium dichromate. A casein glue may be substituted for the albumin or animal glue but I prefer one of the latter. The glue also serves as a binding agent.

It should be understood that other fillers may be substituted for the pyrophyllite but I prefer the latter because of its large bulk. The preservative beta naphthol may be replaced by other preservatives such as alpha-naphthylamine, etc. The copper sulfate also acts as a preventive to spoilage and mildew. Instead of raw sienna, other coloring matter may be used such as the various iron oxide pigments, etc. The coloring matter may penetrate in varying degrees into the wool granules, according to the degree of wet mixing, so that when the faces of the resulting tile are buffed off, a beautiful variegated appearance is given thereto, much resembling natural stone.

The tile may be attached to walls or ceilings by suitable adhesives or by mechanical means. The surface of the applied tile may be cleaned by refinishing the surface by sand-papering.

Treatment of walls and ceilings of buildings with my composition not only results in valuable acoustical correction but also furnishes in itself a pleasing decoration without further treatment. However, if desired, the tile, etc. may be surface treated with a stain, etc. such that the pores of the tile will not be filled or covered.

A test on my sound absorbing tile shows the following approximate results for tile of ¾ inch thickness:—

| Pitch | $C_2$ | $C_3$ | $C_4$ | $C_5$ | $C_6$ | $C_7$ |
|---|---|---|---|---|---|---|
| Absorption (percent) | .11 | .30 | .53 | .70 | .53 | .53 |

I would state in conclusion that while the foregoing description represents a practical embodiment of my invention, I do not limit myself precisely to these details since, manifestly, the same may be considerably varied without departing from the spirit of the invention as defined in the appended claims.

Having thus described my invention, I claim as new and desire to secure by Letters Patent:—

1. A plastic sound absorbing composition including a fibrous material base, a waterproofing agent composed of a mixture of copper sulfate and blood albumin, a gel composed of mixture of cooked starch and Karaya gum, and water.

2. A plastic sound absorbing composition including a base of mineral wool, starch, Karaya gum, coloring matter, pyrophyllite, blood albumin, copper sulfate, beta naphthol, and water.

3. A plastic sound absorbing composition having the following ingredients in substantially the proportions named.

| | |
|---|---|
| Globe pearl starch | 5½ lbs. |
| Karaya gum | 1¼ lbs. |
| Raw sienna | 10 ozs. |
| Pryophyllite | 3 lbs. |
| Beta naphthol | ½ oz. |
| Copper sulfate | 8 ozs. |
| Blood albumin | 1 lb. |
| Granulated mineral wool (4 cu. ft.) | 56 lbs. |

Water to give desired plasticity.

4. A plastic sound-absorbing composition comprising particles of granulated mineral wool, and a binder consisting of starch gel and Karaya gum.

5. A plastic sound-absorbing composition comprising a major portion of particles of granulated mineral wool, a binder capable of cementing said particles together, copper sulfate, and blood albumen.

6. A plastic sound-absorbing composition comprising a major portion of particles of granulated mineral wool, a binder capable of cementing said particles together, copper sulfate, and blood albumen.

7. A plastic sound-absorbing composition comprising particles of granulated mineral wool, a binder consisting of starch gel, and an albuminoid water-proofing agent.

8. A plastic sound-absorbing composition comprising particles of granulated mineral wool, a binder consisting of a starch gel and Karaya gum, copper sulfate, and blood albumen.

9. A plastic sound-absorbing composition comprising particles of granulated mineral wool, a binder consisting of starch gel and Karaya gum, copper sulfate and a protein, and a mineral filler.

10. A plastic sound-absorbing composition comprising particles of granulated mineral wool, a binder consisting of starch gel and Karaya gum, copper sulfate and a protein, and pyrophyllite.

11. A plastic sound absorbing composition that on drying forms a porous sound entrapping surface and which is characterized by connected porosity from the surface through the body portion thereof which comprises particles of granulated mineral wool, a binder therefor comprising a starch gel and Karaya gum, and a water-proofing agent.

12. A plastic sound absorbing composition that on drying forms a porous sound entrapping surface and which is characterized by connected porosity from the surface through the body portion thereof which comprises particles of granulated mineral wool, and a binder therefor comprising starch.

13. A plastic sound absorbing composition that on drying forms a porous sound entrapping surface and which is characterized by connected porosity from the surface through the body portion thereof which comprises particles of granulated mineral wool, and a binder therefor capable of cementing said particles together without substantially impairing their inherent porosity.

14. A plastic sound absorbing composition that on drying forms a porous sound entrapping surface and which is characterized by connected porosity from the surface through the body portion thereof which comprises particles of granulated mineral wool, and a binder capable of cementing said particles together comprising a jelled carbohydrate.

15. A plastic sound absorbing composition that on drying forms a porous sound entrapping surface and which is characterized by connected porosity from the surface through the body portion thereof which comprises particles of granulated mineral wool, and a binder capable of cementing said particles together comprising a jelled carbohydrate and Karaya gum.

16. A plastic sound absorbing composition that on drying forms a porous sound entrapping surface and which is characterized by connected porosity from the surface through the body portion thereof which comprises particles of granulated mineral wool, and a binder capable of cementing said particles together comprising a starch gel.

17. A plastic sound-absorbing composition that on drying is characterized by connected porosity through the body portion thereof whereupon when its exposed surface is finished off a porous sound-absorbing surface is presented, said composition comprising particles of granulated mineral wool and starch serving as a binder therefor.

18. A plastic sound-absorbing composition that on drying is characterized by connected porosity through the body portion thereof whereupon when its exposed surface is finished off a porous sound-entrapping surface is presented, said composition comprising particles of granulated mineral wool and a binder therefor capable of cementing said particles together without substantially impairing their inherent porosity.

GEORGE D. KING.